(12) United States Patent
Aigner et al.

(10) Patent No.: US 10,876,968 B2
(45) Date of Patent: Dec. 29, 2020

(54) OPTOCHEMICAL SENSOR (71) Applicant: Mettler-Toledo GmbH, Greifensee (CH)

(72) Inventors: Daniel Aigner, Thalwil (CH); Robert Lettow, Zürich (CH); Toni Schneider, Winterthur (CH); Martin Winkler, Galgenen (CH); Stefanie Zuber, Zürich (CH)

(73) Assignee: Mettler-Toledo GmbH, Greifensee (CH)

( * ) Notice: Subject to any disclaimer, the term of this patent is extended or adjusted under 35 U.S.C. 154(b) by 238 days.

(21) Appl. No.: 15/973,866

(22) Filed: May 8, 2018

(65) Prior Publication Data

US 2018/0328847 A1 Nov. 15, 2018

(30) Foreign Application Priority Data

May 12, 2017 (EP) .................................. EP17170846

(51) Int. Cl.
*G01N 21/64* (2006.01)
*G01K 11/12* (2006.01)
(Continued)

(52) U.S. Cl.
CPC ........... *G01N 21/643* (2013.01); *G01K 11/12* (2013.01); *G01N 21/77* (2013.01); *G01N 31/22* (2013.01); *G01N 2021/6432* (2013.01); *G01N 2021/6439* (2013.01); *G01N 2021/773* (2013.01); *G01N 2021/775* (2013.01); *G01N 2021/7786* (2013.01)

(58) Field of Classification Search
CPC ...... G01N 21/643; G01N 21/77; G01N 31/22; G01N 2021/6432; G01N 2021/6439; G01N 2021/773; G01N 2021/775; G01N 2021/7786
USPC ...................................................... 422/82.07
See application file for complete search history.

(56) References Cited

U.S. PATENT DOCUMENTS 5,783,152 A 7/1998 Nave
6,303,386 B2 * 10/2001 Klimant ............. G01K 11/3213
374/E11.017
(Continued)

FOREIGN PATENT DOCUMENTS

JP 2008-128905 A 6/2008

OTHER PUBLICATIONS

Shea, K.J. et al. (2001). "Bridged Polysilsesquioxanes. Molecular-Engineered Hybrid Organic-Inorganic Materials." Chem. Mater. 13(10): 3306-3319. (Year: 2001).*
(Continued)

*Primary Examiner* — Matthew D Krcha
*Assistant Examiner* — Jacqueline Brazin
(74) *Attorney, Agent, or Firm* — Standley Law Group LLP; Jeffrey S. Standley; Stephen L. Grant (57) ABSTRACT

An sensor (2) based on an optical-sensing technique measures gaseous or dissolved analytes in a measurement medium (4). The sensor has a sensor housing (6) and an optochemical sensor element (20, 220) arranged within the sensor housing. The optochemical sensor element (220) has a substrate (222), a sensing layer (224) and a barrier layer (230). The barrier layer is arranged to protect the optochemical sensor element from interfering substances (234) present in the measurement medium.

14 Claims, 5 Drawing Sheets

(51) Int. Cl.
*G01N 21/77* (2006.01)
*G01N 31/22* (2006.01)

(56) References Cited

U.S. PATENT DOCUMENTS

| | | | |
|---|---|---|---|
| 6,562,424 | B1 | 5/2003 | Reisfeld et al. |
| 6,653,148 | B2 | 11/2003 | Trapp et al. |
| 7,740,904 | B2 | 6/2010 | Shahriari |
| 9,599,596 | B2 | 3/2017 | Schoenfuss et al. |
| 2002/0012610 | A1* | 1/2002 | Dufresne ............... A61L 2/28 422/28 |
| 2010/0203649 | A1* | 8/2010 | Thrier ............... G01N 31/225 436/127 |
| 2015/0068898 | A1 | 3/2015 | Fanselow et al. |
| 2015/0147231 | A1* | 5/2015 | Tscherner ............... G01N 21/77 422/82.07 |
| 2015/0192519 | A1 | 7/2015 | Schoenfuss et al. |
| 2016/0081605 | A1* | 3/2016 | Kahlman ............... A61B 5/145 600/329 |
| 2016/0116408 | A1 | 4/2016 | Kahlman et al. |

OTHER PUBLICATIONS

Dobson, J.V. et al., The Permeability of Gases Through PTE and Other Membranes at 25° C., Electrochimica Acta, vol. 31, No. 2, pp. 231-233, 1986.

Merkel, T.C., et at., Gas Sorption, Diffusion, and Permeation in Poly(dimethylsiloxane), Journal of Polymer Science, Part. B: Polymer Physics, vol. 38, pp. 415-434, 2000.

Shea, K.J. et al., Bridged Polysilsesquioxanes. Molecular-Engineered Hybrid Organic-Inorganic Materials, Chem. Mater, 13, pp. 3306-3319, 2001.

Cajlakovic, M. et al., Development of an Opto-chemical Carbon Dioxide Sensor for Aquaculture and Oeanography Applications, Fifth International Conference on Sensing Technology, 2011, pp. 411-416.

* cited by examiner

OPTOCHEMICAL SENSOR

CROSS-REFERENCE TO RELATED APPLICATIONS

This application claims priority to EP 17170846.4, filed on 12 May 2017, which is incorporated by reference as if fully recited herein.

TECHNICAL FIELD

The invention relates to an optochemical sensor element for measuring gaseous or dissolved analytes in a measurement medium and the use of the optochemical sensor for the measurement of gaseous or dissolved analytes in a measurement medium.

BACKGROUND

Optochemical sensors are used for the measurement of a wide variety of analytes, such as gaseous or dissolved gases, metal ions etc., in e.g. environmental, industrial, laboratory, medical, and biological applications. The measurement technology of such optochemical sensors is based for example on absorbance, reflectance or luminescence techniques, wherein luminescence detection is a preferred technique due to its higher sensitivity and selectivity towards the respective analytes. Luminescences can be measured by detecting the luminescence lifetime, the intensity of the luminescence light and/or through luminescence quenching.

The term luminescence respectively photoluminescence covers different phenomena, such as fluorescence and phosphorescence, which differ in their photophysical process. Indicators that are used in an optochemical sensor based on either the fluorescence or the phosphorescence phenomenon are better known as fluorophors or phosphorescent indicators respectively.

An optochemical sensor based on any of those luminescence techniques comprises a signaling substance, commonly referred to as an indicator that is capable of interacting with the analyte to be measured in the process medium.

In principle, it is possible to determine gaseous or dissolved gases, such as, for example carbon dioxide, oxygen or ozone in a process medium by photoluminescence and/or photoluminescence quenching, as long as the indicator is sensitive in regard to the analyte of interest. The term "process medium" in this context encompasses liquids and gases as well as mixtures thereof.

Optochemical sensors based on luminescence have been widely used for the determination of these analytes in simple as well as complex media, such as laboratory, pharmaceutical, chemo-pharmaceutical or industrial process environments. Such environments can comprise sensitive environments as well as harsh environments involving for example high temperature and high pressure, and/or comprising contaminants, cross sensitive or corrosive substances, such as e.g. sulfurous oxides and/or chlorine containing vapor or gaseous compounds. Conventional sensors can be damaged by high levels of contaminants, cross sensitive, corrosive and/or interferents present in the process medium. The term "interferent" is applied to any interfering substance whose presence in a measurement medium interferes with an analytical procedure and generates incorrect measurements. Cross sensitivity occurs when the sensor is sensitive to any other substance in the process medium other than the target analyte. This is because, conventional optochemical sensors fall short of providing adequate protection to the various elements of its optochemical sensor element from such substances. Therefore, exposing a sensor to such substances can often lead to falsified measurements further leading to undesirable outcomes in the process environment. The sensitivity of the sensor could also be affected. Consequently, in such environments the service life of the optochemical sensor is greatly limited and/or reduced thereby indirectly or directly leading to costly interruptions or increased maintenance costs in process operations.

Optochemical sensors are known to comprise one or more protection layers, for example, protection layers may be arranged as a light protection layer or membranous protection layers. For example, one of the protection layers serves as a reflection layer to reflect light from the optical emission unit of the sensor whereas another protection layer serves as an optical insulation to prevent any stray light entering the sensor from measurement medium, thereby optically insulating the sensor.

U.S. published application 2015/0147231 A1 discloses an optochemical sensor having an optical insulating layer and a micro or macroporous membranous protective layer, which protects the sensor against environmental influences or ambient light.

U.S. published application 2015/0110687 A1, which later issued as U.S. Pat. No. 9,599,596 B2, discloses an optochemical sensor for determining the molecular oxygen content of a gaseous or liquid medium. The sensor comprises a sensor element with at least one luminescent indicator composed of a luminescence-active agent, and indicator protectors, wherein these indicator protectors protect the luminescent indicators against destroying or inactivating influences from the medium to be analyzed. These indicator protectors are arranged in a layer of the sensor element that faces towards the medium. The protection of the indicators is achieved by inactivation, neutralization and/or adsorptive immobilization of compounds and/or by inactivation, neutralization respectively insulation of energy-rich radiation, which has an inactivating and/or destructive, especially oxidizing, effect on the indicators. Therefore, suitable indicator protectors include reactants of one or more compounds which act on the indicators in a destructive/deactivating manner upon contact with them. These indicator protectors are provided within the optochemical sensor element such that the diffusion rate of the molecular oxygen formed on the indicator protectors by the reduction of strong oxidants back into the medium is greater than the diffusion rate of said molecular oxygen in the direction of the at least one layer bearing the indicator molecules.

EP 1199 556 B1, which has U.S. Pat. No. 6,653,148 as a family member, discloses an optical sensor for determining an analyte in a medium wherein the optical sensor has a sensing layer with a luminescence indicator, and a protective layer that contains the same fluoropolymer as the sensor matrix. The function of the protective layer is to prevent direct contact between the sensor matrix and the measured medium thus aiding in counteracting a mechanical damage of the sensor matrix by abrasive particles in the process medium.

U.S. Pat. No. 7,740,904 B2 discloses a method for manufacturing a medium coated sensor wherein the medium is used to immobilize colorimetric and/or fluorescence indicators. This synthesized medium is said to have improved resistance during exposure to hydrocarbons specifically in environments containing volatile hydrocarbon compounds wherein the material in particular repels hydrocarbons as well as non-polar hydrocarbons (i.e. aromatics hydrocarbons and aliphatic hydrocarbons). Therefore, an oxygen indicator is immobilized on the synthesized medium and then coated on a substrate. The medium so prepared is impermeable to hydrocarbons in fuels or a combustion process and is permeable to oxygen.

At least two aspects play a significant role in the selection of an indicator to be immobilized on a sensing layer of an optochemical sensor element. In one aspect, the choice is dependent on the analyte to be measured. In the second aspect, the choice of the indicator is dependent on the solubility of the chosen indicator in the polymer matrix. The use of an immobilizing matrix to serve two functions in one structural combination would often be met with the limitation of the choice of the indicator that is most suitable for an analyte to be detected. In particular, the analyte-sensitive indicator would need to be solvable in the matrix suited to offer resistance to interferents from the measurement medium. Therefore, a matrix used to function as an immobilizing matrix for the indicator and at the same time, used to function as a resistant layer to interferents from the measurement medium would greatly restrict the choice of an optimal indicator better suited for the determination of a particular analyte.

Therefore, there is a need for optochemical sensors that can be effectively used in complex and/or harsh media, which in particular can comprise interferents, such as corrosive gases or volatile organic compounds. There is also a need for an optochemical sensor to effectively function in such complex and/or harsh media with no serious effects on the response times of the sensor. Consecutively, there is a need for an optochemical sensor with an improved and increased service life.

SUMMARY

This need is met by an optochemical sensor for measuring gaseous or dissolved analytes in a measurement medium, the optochemical sensor comprising: a sensor housing, an optochemical sensor element arranged within the sensor housing, wherein the optochemical sensor element is in contact with the measurement medium during measurement operation. The optochemical sensor element further comprises: a substrate, a sensing layer arranged on the substrate and a barrier layer, wherein the barrier layer provides protection to the optochemical sensor element from at least one interferent in the measurement medium by preventing the passage of the interferent while allowing the passage of the gaseous or dissolved analyte.

The term "interferent" in this context applies to a substance that is not a target analyte and is present in the same medium as the target analyte. Further, the interferent has the potential to bring about cross sensitivity in the optochemical sensor, wherein cross sensitivity is said to occur when the sensor is sensitive to any other substance in the medium other than the target analyte. The presence of interferents in the measurement medium reduces or changes the photoluminescence yield, photoluminescence decay time or spectral properties of the luminescent indicator in the sensing layer and the interferent can act as an additional quencher thereby leading to falsified measurements.

The barrier layer preferably protects the optochemical sensor element by impeding the passage of one or more interferents from the measurement medium thereby preventing falsified measurements. At the same time the barrier layer is permeable to the analyte to be detected. This feature is particularly advantageous for an optochemical sensor based on the operating principle of photoluminescence quenching. Further, is it also essential for the barrier layer to have a good permeability towards the analyte to be measured in order to maintain a good response time of the optochemical sensor.

Substances that can interfere with the measurement of gaseous or dissolved gases are e.g. volatile organic compounds, unsaturated organic compounds, aromatic compounds, sulfurous oxides or other sulfur-containing gaseous or volatile compounds, nitric oxides or other nitrogen-containing gaseous or volatile compounds, and/or chlorine containing vapor or gaseous compounds. In particular, further examples of interferents are sulfur dioxide, carbon monoxide, methane, ethane, propane, butane, pentane, hexane, ethylene, acetylene, hydrogen, chlorine, methanol, benzol, ethylbenzol, toluole, o-xylene, m-xylene, p-xylene, propylene, hydrogen chloride and butadiene.

Further, the barrier layer can also offer protection against abrasive measurement media. The barrier layer comprises a network with both organic and inorganic structural elements. The barrier layer is formed by applying a solution comprising a curable precursor. The curable precursor comprises an organic part and at least one function group suitable for curing that is linked to the organic part. The organic part provides the organic backbone of the precursor molecule. Examples for such an organic part comprise functional groups such as carboxy ester, amide, imide, carbamate, thiocarbamate, amidine, imide acid ester, thioester, thioamide, dithio ester, carbonate, carbon diamide, guanidine, ether and/or acetal. Preferably, the organic part is composed such that the elements sulfur, nitrogen and oxygen together make up a ratio of 25-60% molecular weight, with respect to the total molecular weight of the organic part. More preferably, the organic part is composed such that the elements sulfur, nitrogen and oxygen together make up a ratio of 30-45% molecular weight, with respect to the total weight of the organic part.

The at least one functional group suitable for curing is selected from any of: trialkoxysilane, dialkoxysilane, or monoalkoxyalkylsilane. A precursor comprising any of the above mentioned compounds possesses excellent mechanical strength and resistance to scratching and abrasion.

The barrier layer is thus formed such that it is arranged to face the measurement medium. It is therefore understood that the barrier layer is formed on an underlying layer thereby being configured to face the measurement medium. The barrier layer is arranged on the sensing layer, such that it provides protection to the optochemical sensor element from at least one interferent in the measurement medium by preventing the passage of the interferent while allowing the passage of the gaseous or dissolved analyte.

In another embodiment, the barrier layer is formed on the substrate and is arranged to face the measurement medium. In this embodiment, the sensing layer is arranged on the substrate on its side directed away from the measurement medium.

The optochemical sensor further comprises a light source and a detection unit arranged within a housing of the sensor. The optochemical sensor element is arranged within the housing of the optochemical sensor, such that the optochemical sensor element comprising the sensing layer is placed in a light path between the light source, and the detection unit.

The optochemical sensor comprises two ends i.e. a distal end and a proximal end. At the distal end, the optochemical sensor is in contact with the measurement medium. At the proximal end, the optochemical sensor comprises a sensor head, which is connected to a control unit via a wired or wireless connection.

The optochemical sensor element comprises a sensing layer having an indicator immobilized in a polymer matrix. The term "indicator" in this context refers to a phosphorescent indicator or a fluorophor, and herein, will be referred to as indicator in this invention. The indicator is sensitive to the analyte of interest in the measurement medium. The analyte to be measured is a gaseous or dissolved analyte in the measurement medium.

The choice of the indicators for the optical detection of an analyte in the measurement medium is usually dependent on various aspects. In one aspect, the choice is dependent on the analyte that is to be measured. Suitable indicators are chosen not only for their sensitivity towards the analyte of interest but also for a preferred lower cross sensitivity towards other interferents that may be present in the medium. Aspects which further influence the selection of an indicator are besides others their chemical and photochemical stability under operating conditions.

In an exemplary embodiment, the analyte to be measured in the measurement medium are gases or dissolved gases, such as oxygen, ozone or carbon dioxide.

Examples of luminescence indicators suitable for the measurement of gaseous or dissolved oxygen are metal-organic complexes comprising a polycyclic aromatic hydrocarbon, such as pyrene and/or its derivatives, oxygen sensitive transitional metal polypyridil complex, in particular $[Ru(bpy)_3]^{2+}$, or a metalloporphyrin complex comprising in particular platinum or palladium.

Examples of luminescence indicators suitable for the measurement of carbon dioxide are 8-hydroxypyrene-1,3,6-trisulfonic acid or a 1,4-diketo pyrrolo-[3,4-c]-pyrrole derivative.

Examples of a luminescence indicator suitable for the measurement of ozone are certain xanthene dyes, such as 2,7-dichloro-o-butyl-3-enylfluorescein.

In an embodiment, the optochemical sensor element further comprises a temperature sensing layer. This layer is configured to detect the temperature of the measurement medium. This sensing layer comprises a temperature sensitive indicator immobilized on a polymer matrix. The polymer matrix herein mentioned can be same or different in composition of the polymer matrix of the analyte sensing layer. Examples of suitable polymers used as a polymer matrix include: polystyrene film, cyclic olefin copolymer such as ethylene-norbornene copolymer, cyclic olefin polymer ("COP") and poly(n-methyl methacrylimide) (PMMI).

The temperature sensing layer can be arranged on the surface of the substrate opposite to the surface on which the analyte sensing layer is arranged. Thereby, the analyte sensing layer and the temperature sensing layer are separated from each other by means of the substrate. This configuration offers the advantage that each sensing layer has different indicators that are optimally suited for the specified measurement.

It is also possible for the temperature sensing layer to be arranged on the surface of the substrate facing the measurement medium so that the temperature sensing layer is arranged between the substrate and the sensing layer.

Further the temperature sensitive indicator can be immobilized in the same polymer matrix as the analyte sensitive indicator, thereby creating a polymer matrix which is sensitive towards temperature of the measurement medium, and the analyte.

Examples of temperature sensitive indicators suited for the measurement of the temperature of the measurement medium include any of the following: rhodamin and/or its derivatives, temperature sensitive metal ligand complexes in particular $[Ru(bpy)_3]^{2+}$ or lanthanide-doped bulk materials, in particular doped $Al_2O_3$ or YAB doped with chromium ions and/or mixtures thereof.

Examples of suitable materials used as a substrate are selected from the group consisting of glass, polyester, amorphous or partially crystalline polyamide, acrylate, polycarbonate, ethylene-norbornene copolymer (cyclic olefin copolymer). The substrate can also be prepared from a combination of these materials.

The optochemical sensor element comprises the substrate on which different layers are applied, in particular the sensing layer and the barrier layer. The optochemical sensor comprises at least one additional layer. The substrate has a thickness of about 200 to 1500 µm, preferably 400 to 1100 µm. The combined thickness of the layers arranged on this substrate lies in the range of 30 to 100 µm. The thickness of the barrier layer lies in the range of 0.2 to 5 µm, preferably in the range of 0.5 to 2 µm.

The thickness of said temperature sensing layer lies in the range of 10 to 100 µm.

The optochemical sensor comprises a light reflecting layer. Further, the optochemical sensor comprises an optical insulation layer and/or a protection layer and/or a combination of these.

The light reflection layer is arranged on the barrier layer, such that it is arranged to face towards the direction of the measurement medium. The light reflection layer essentially reflects the excitation radiation back into the sensing layer. The optical insulation layer can be arranged on said light reflection layer, such that it is arranged to face towards the measurement medium. This optical insulation layer serves as a stray light protection layer. The advantage of employing an optical insulation layer is that such a layer blocks stray light emitting from the measurement medium and thereby, prevents stray light from interfering with the measuring results.

In a further embodiment, a protection layer is arranged on the optical insulation layer such that it is arranged to face towards the measurement medium. A membrane of polytetrafluoroethylene (PTFE) is an example of a material suitable for this layer. A protection layer comprising said PTFE membrane aids in retarding the diffusion of the interferents into the sensor element. Therefore, this protection layer provides additional resistance against interferents in the medium.

BRIEF DESCRIPTION OF THE DRAWINGS

Other features and advantages disclosed herein will become more apparent from the following detailed description of exemplary embodiments when read in conjunction with the following figures. The figures show.

DETAILED DESCRIPTION

Figure 1:
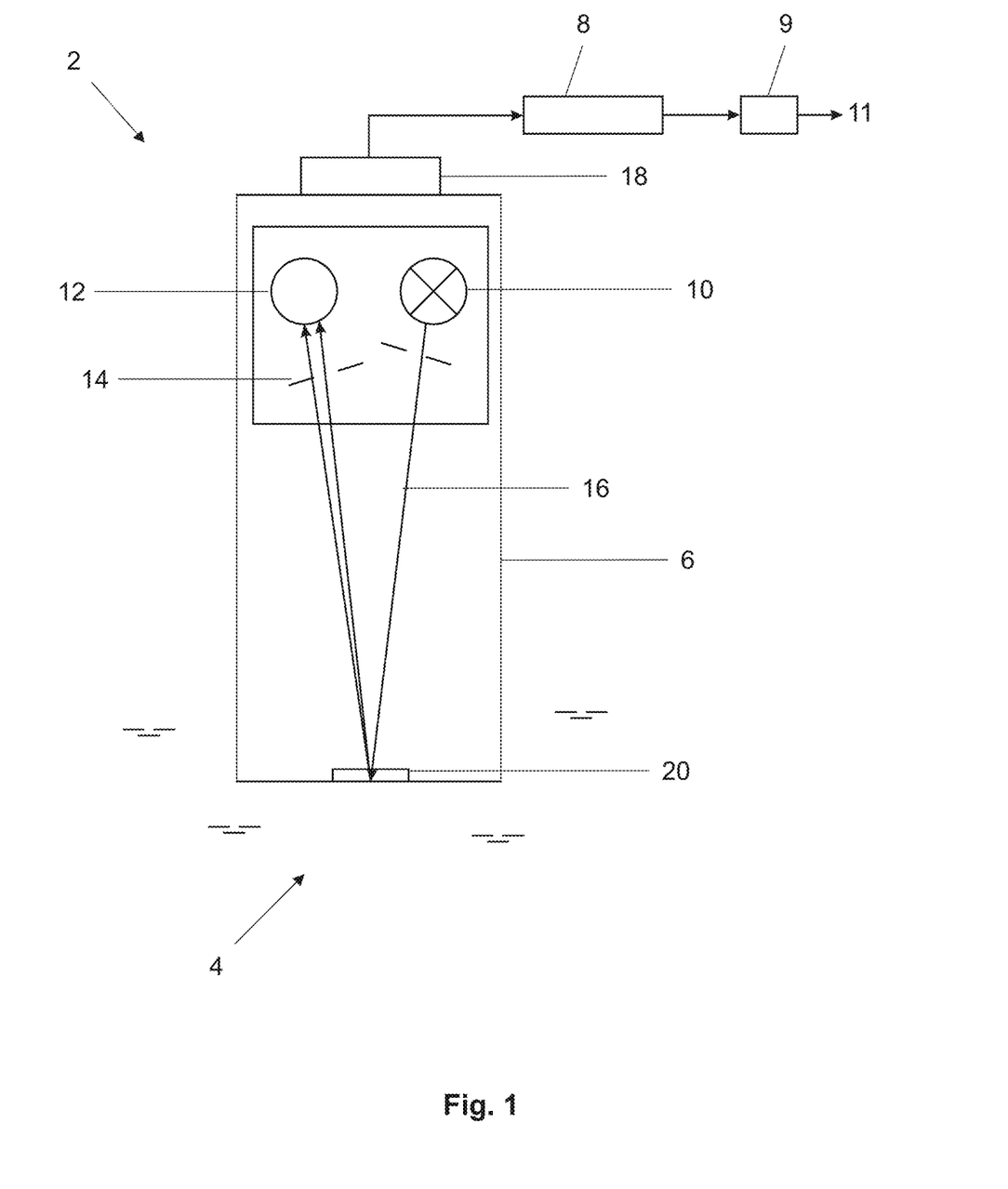
FIG. 1, which is a schematic of an embodiment of an optochemical sensor.

FIG. 1 shows a schematic of an optochemical sensor 2 immersed in a measurement medium 4. The optochemical sensor 2 is immersed in the measurement medium at its distal end. At its proximal end, the optochemical sensor has a sensor head 18, which is connected via a wired or wireless connection to a control unit 8. An optochemical sensor element 20 is arranged within a sensor housing 6, and at the distal end of the optochemical sensor 2.

The optochemical sensor comprises a light source 10, a detection unit 12 and optical elements 14 arranged within the sensor housing 6. Further, the optochemical sensor 2 can comprise more than one light source and/or more than one detector respectively within the sensor housing 6.

During measurement operation of the optochemical sensor 2 based on the principle of luminescence, excitation light is emitted by the light source 10 and is directed by optical elements 14, such as filters, mirrors or lenses that are arranged within the sensor housing 6, towards the optochemical sensor element 20 such that the emitted light interacts with the optochemical sensor element 20. A light path 16 is indicated by arrows. The optochemical sensor element is arranged in the light path 16 between the light source 10 and detection unit 12. A photoluminescence response signal, in particular a fluorescence or phosphorescence response signal that is emitted after excitation interacts with the optochemical sensor element 20 and is detected by the detection unit 12. As previously described, in optochemical sensors based on photoluminescence a change in the luminescent signal caused by an analyte in the measurement medium is detected. The detection unit 12 comprises at least one detector, for example a photodiode. Depending on the number of analytes in the measurement medium to be measured, the detection unit can further comprise corresponding detectors for one or more of the parameters. The detection unit 12 further comprises optical filters 14 that are positioned in front of the detectors. These optical filters help in separating signals that are received from the optochemical sensor element 20. The optochemical sensor 2 further comprises optical fibers to direct the light to and/or emit the light from the optochemical sensor element.

The response signal received by the detection unit 12 is amplified and processed by the control unit 8. The control unit is connected via a wired or wireless connection to the sensor head 18 and it can also function as a regulation unit. The control unit 8 can further be connected to a terminal 9 which in turn can be connected to a display, a process control system, a transmitter or a further processing unit and/or similar devices 11. The control unit 8 is arranged either as an external unit or entirely or in part inside the sensor housing 6. In this embodiment, the control unit 8 has either a wire-bound or wireless connection to the sensor head 18 of the optochemical sensor 2. The state of the art includes different variants of the control unit and the latter is therefore only symbolically illustrated. The optochemical sensor element 20 is releasably connected to the sensor housing 6 so that the optochemical sensor element 20 can be easily replaced.

Figure 2:
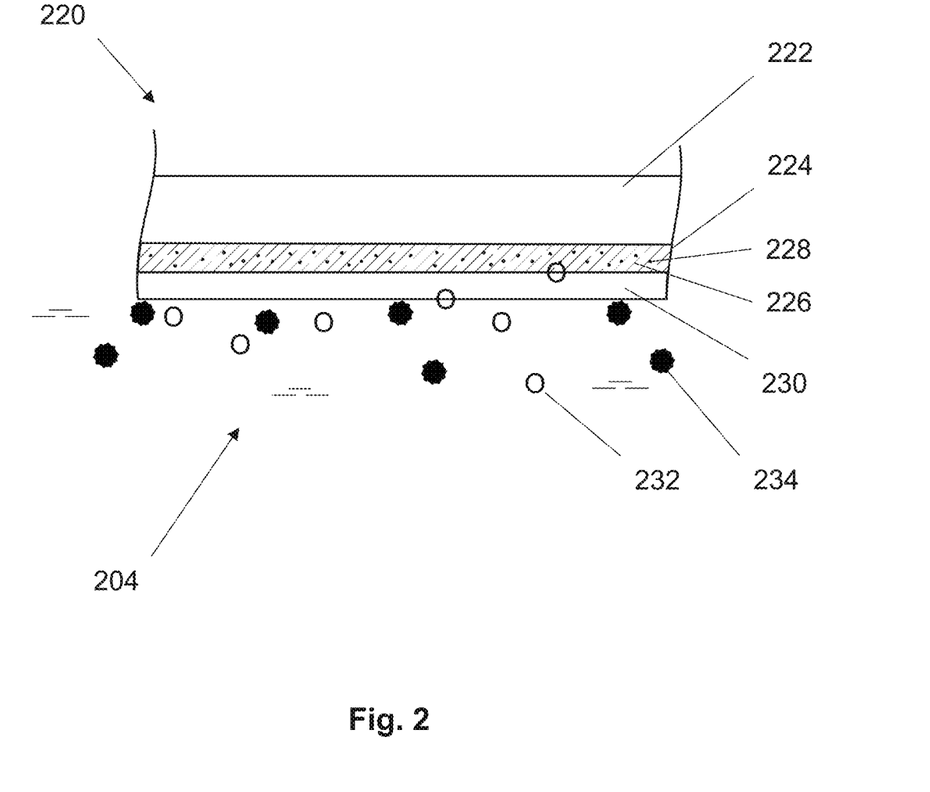
FIG. 2, which is a schematic longitudinal cross sectional view of an optochemical sensor element with a barrier layer according to present invention.

FIG. 2 shows a schematic cross sectional view of an optochemical sensor element 220 according to the present invention. The optochemical sensor element 220 comprises a sensing layer 224 arranged on a substrate 222. As shown in the figure, the sensing layer 224 faces towards a measurement medium 204. The sensing layer 224 is an analyte sensing layer to measure the analyte of interest in the measurement medium. The sensing layer 224 comprises an indicator 228 immobilized in a polymer matrix 226. The indicator 228 is sensitive towards the analyte to be detected, such as gaseous or dissolved oxygen, carbon dioxide or ozone. Preferably, the indicator is sensitive to gaseous or dissolved oxygen 232 in the measurement medium 204.

A barrier layer 230 is arranged on the sensing layer 224. The barrier layer 230 is arranged such that it provides protection to the optochemical sensor element 220 from one or more interferents 234 present in the measurement medium 204. In another embodiment, the barrier layer is formed and arranged on the substrate and is arranged to face the measurement medium. In this embodiment, the sensing layer is arranged on the substrate's side that is directed away from the measurement medium.

The presence of one or more interferents in the measurement medium often interferes with detection measurements during photoluminescence quenching. Examples of possible interferents in a measurement medium include volatile organic compounds, unsaturated organic compounds, aromatic compounds, sulfurous oxides or other sulfur-containing gaseous or volatile compounds, nitric oxides or other nitrogen-containing gaseous or volatile compounds, and/or chlorine containing vapor or gaseous compounds. In particular, further examples of possible interferents are sulfur dioxide, carbon monoxide, methane, ethane, propane, butane, pentane, hexane, ethylene, acetylene, hydrogen, chlorine, methanol, benzol, ethylbenzol, toluole, o-xylene, m-xylene, p-xylene, propylene, hydrogen chloride and butadiene.

The barrier layer 230 provides protection to the optochemical sensor element 220 by impeding the passage of one or more interferents from the measurement medium 204. At the same time the barrier layer 230 is permeable to the analyte to be measured, e.g. gaseous or dissolved oxygen, ozone or $CO_2$.

Examples of suitable indicators for the measurement of particularly oxygen are metal-organic complexes comprising polycyclic aromatic hydrocarbons such as pyrene and/or pyrene derivatives, oxygen sensitive transitional metal polypyridil complexes, in particular $[Ru(bpy)_3]^{2+}$ or metalloporphyrin complexes comprising in particular platinum or palladium. Additionally, there are numerous commercially available indicators that may be used in the measurement of oxygen.

In a further exemplary embodiment, the optochemical sensor element is configured for measuring dissolved or gaseous carbon dioxide in the measurement medium. A suitable indicator for the measurement of dissolved or gaseous carbon dioxide is 8-hydroxypyrene-1,3,6-trisulfonic acid.

Figure 3:
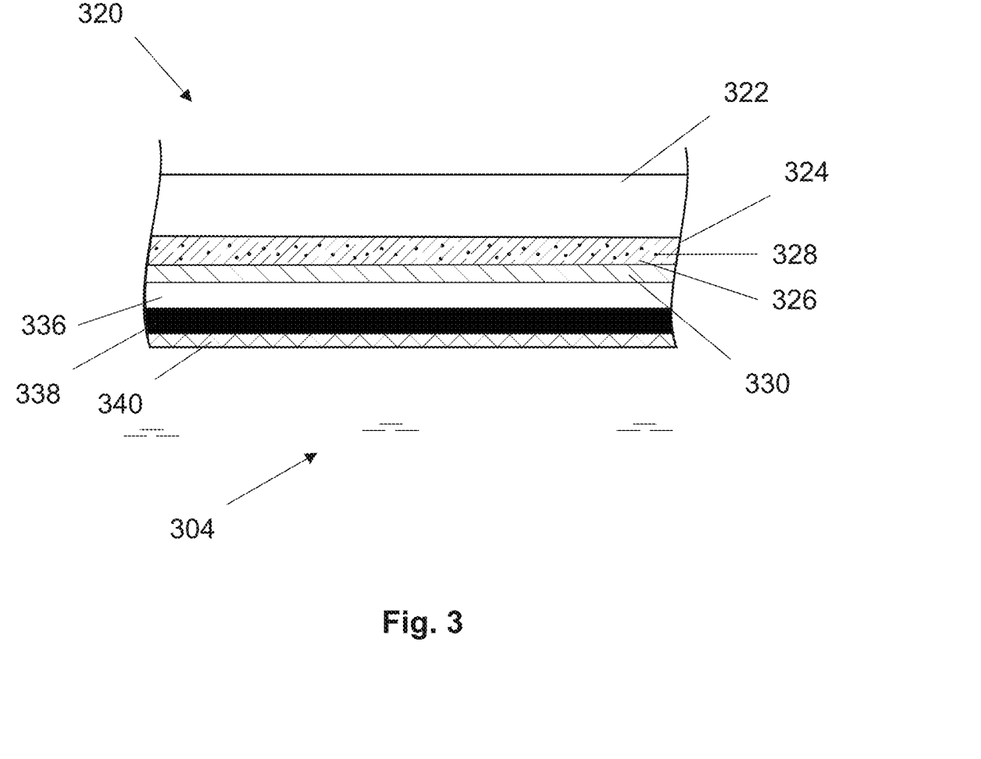
FIG. 3, which is a schematic longitudinal cross sectional view of an optochemical sensor element having additional layers according to the present invention.

FIG. 3 shows a schematic longitudinal cross sectional view of the optochemical sensor element 320 having additional layers according to the present invention. The optochemical sensor element 320 comprises a sensing layer 324 arranged on a substrate 322. The sensing layer 324 comprises an indicator 328 immobilized in a polymer matrix 326 wherein the indicator 328 is sensitive to a gaseous or dissolved analyte, such as oxygen, carbon dioxide or ozone.

The optochemical sensor element 320 is covered with at least one additional layer. Examples of such additional layers are a light reflection layer, an optical insulation layer, a protection layer etc. In a preferred embodiment the optochemical sensitive element is covered with three additional layers.

Either of the additional layers may be comprised of the same base material, however, the two of the layers may be doped with different substances to provide optical protection and insulation to the optochemical sensor element and in turn to the optochemical sensor.

As seen in FIG. 3, a light reflection layer 336 is arranged on the barrier layer 330. Such an arrangement is advantageous because the light reflection layer 336 essentially reflects almost all the excitation radiation back into the sensing layer 328 thereby providing a backscatter of the light emitted from a light source of the optochemical sensor. This arrangement particularly helps in achieving a higher luminescence signal and provides a measuring device with shorter response times. An example of a suitable material as light reflection layer is silicone doped with titanium dioxide particles.

An optical insulation layer 338, in this embodiment, is arranged on the reflection layer 336. In this case, the optical insulation layer 338 serves as a stray light protection layer and is for example a black silicone layer comprising carbon. The advantageous feature of including the stray light protection layer as the second layer is that it blocks stray light that could possibly enter from the measurement medium 304 and interfere with the measurement results. Further, a protection layer 340 can be arranged on the optical insulation layer 338, as shown in FIG. 3. The protection layer 340 is arranged such that it faces towards the direction of the measurement medium and is in direct contact with the measurement medium 304. Preferably, the protection layer is provided as foil or membrane comprising polytetrafluoroethylene (PTFE).

Figure 4:
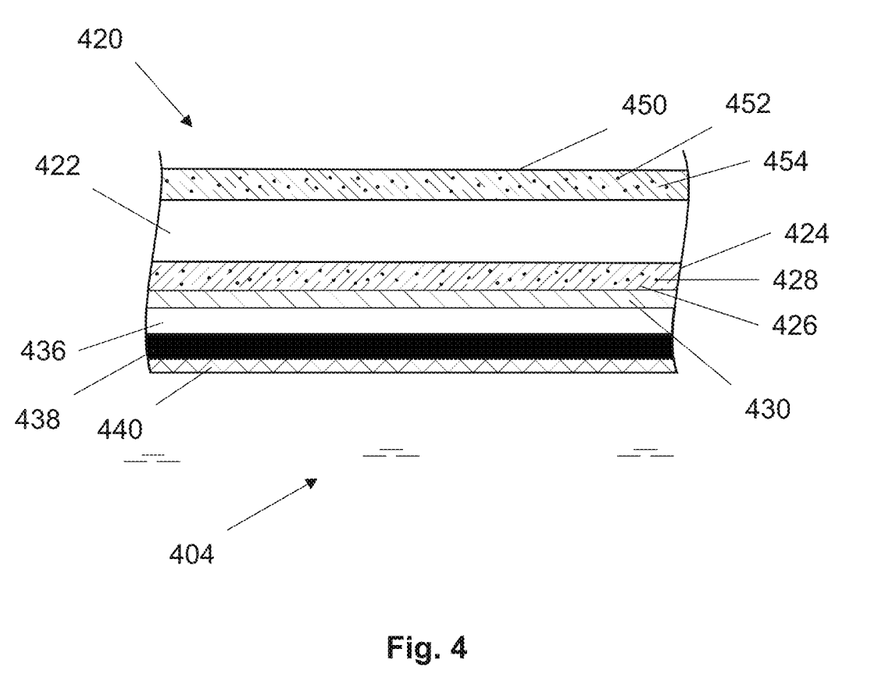
FIG. 4, which is a schematic of an embodiment of an optochemical sensor element according to present invention.

FIG. 4 shows a schematic of an embodiment of an optochemical sensor element 420 according to the present invention. In this embodiment, the optochemical sensor element 420 comprises an additional sensing layer compared to the optochemical sensor element as explained in FIGS. 1 to 3.

This additional sensing layer is a temperature sensing layer 450 for measuring temperature of the measurement medium 404. The temperature sensing layer 450 is arranged on the substrate 422 such that the temperature sensing layer 450 lies opposite to the sensing layer 424. The temperature sensing layer 450 comprises a temperature sensitive indicator 452 immobilized in a polymer matrix 454. The polymer matrix 454 is either same or different in composition of the polymer matrix 426 of the sensing layer 424.

In a further embodiment (not shown in the figures), the temperature sensitive indicator and the analyte sensitive indicator are immobilized in the same polymer matrix. Therefore, a sensing layer comprising the temperature sensitive indicator and analyte sensitive indicator are arranged on a substrate such that the sensing layer faces towards the direction of the measurement medium.

According to the present invention, the barrier layer 230 comprises a network with both organic and inorganic structural elements. It is formed from a solution of a curable precursor. Examples of suitable organic part include: carboxy ester, amide, imide, carbamate, thiocarbamate, amidine, imide acid ester, thioester, thioamide, dithio ester, carbonate, carbon diamide, guanidine, ether, acetal. Preferably, the organic part is composed such that the elements sulfur, nitrogen and oxygen together make up a ratio of 25-60% molecular weight, with respect to the total molecular weight of the organic part. More preferably, the organic part is composed such that the elements sulfur, nitrogen and oxygen together make up a ratio of 30-45% molecular weight, with respect to the total molecular weight of the organic part.

The curable precursor was deposited in a layer form from a precursor solution. The curable precursor comprises at least one functional group suitable for curing that is linked to the organic part. The at least one functional group suitable for curing is selected from any of: trialkoxysilane, dialkoxyalkylsilane, or alkoxytrialkylsilane.

The precursor molecule was prepared by a reaction between a diol and an iso-cyanato-silane in the presence of a catalyst under an inert atmosphere for a duration of about 30 minutes at 50° C.

Exemplary diols suitable to be used to prepare the precursor can be selected from any of the following: ethylene glycol; proylene gylcol; all isomers of butane diol, butane diol, pentane diol, hexane diol, heptane diol, octane diol, nonane diol, or decane diol.

Suitable isocyanatosilanes include for example: isocyanatosilanes, isocyanatomethyltriethoxysilane, isocyanatoethyltriethoxysilan, isocyanatopropyltriethoxysilane, isocyanatobutyltriethoxysilane, isocyanatomethyltrimethoxysilane, isocyanatoethyltrimethoxysilane, isocyanatopropyltrimethoxysilane, or isocyanatobutyltrimethoxysilane.

Suitable catalysts include for example: tin organic compounds, preferably dibutyltin dilaurate, diethyltin dilaurate, diphenyltin dilaurate, dibutyltin dimyristate, diethyltin dimyristate, diphenyltin dimyristate, dibutyltin dipalmitate, diethyltin dipalmitate, diphenyltin dipalmitate, dibutyltin distearate, diethyltin distearate or diphenyltin distearate.

The prepared precursor was dissolved in a common solvent, such as an organic solvent. Examples of organic solvents include: chloroform, toluene, methyl-tertbutyl ether, diisopropyl ether, tetahydrofurane, ethyl acetate and other esters of acetic acid, ethyl formiate and other esters of formic acid, ethyl propanoate and other esters of propanoic acid, ethyl butyrate and other esters of butyric acid, dimethylformamide and other formamides, dimethylacetamide and other acetamides; all isomers of trichloroethane, dichloroethane, chloroethane, xylenes, trimethylbenzene, ethylbenzene, benzene, hexanes, heptanes, octanes or pentanes.

Further, a wetting agent, such as modified polydimethylsiloxane (BYK®-306 procured from BYK), was added to the solution followed by the addition of a curing catalyst. Examples of curing catalysts include: any protic acid or Lewis-acid and any compound releasing such an acid/Lewis-acid at elevated temperature. Preferably, curing catalysts can be selected from any one of the following: hydrochloric acid, sulfuric acid, nitric acid, aluminum acetylacetonate, acetic acid, formic acid, propanoic acid or butyric acid.

The resulting precursor solution was then applied as a coat to the substrate of the optochemical sensor element, wherein the substrate was provided with a sensing layer. The methods used for coating are from any of the following methods: knife coating, screen printing, spray coating, dip coating, other forms of printing, micro-dispensing. Thereafter, the optochemical sensor element was left to dry in air in order to dry the applied the solution to result in a barrier layer. Examples of further curing methods include but are not limited to: thermal curing, UV curing or microwave curing.

The following method elaborates the steps of applying a barrier layer on an optochemical sensor element of an optochemical sensor for the determination of dissolved or gaseous oxygen in a measurement medium.

EXAMPLE 1

A mixture of 11.1 g of distilled 1,6-hexandiole and 46.503 mL of isocyanatopropyl-triethoxysilane (ICTES) was stirred under argon for 30 minutes at 50° C. After 30 minutes the oil bath was removed and 31 mg of dibutyltin-dilaurate was added. After a subsequent increase and decrease of the temperature of the reaction mixture, the reaction mixture was further heated with the oil bath to 50° C. The reaction was terminated after approximately 60 minutes when the reaction mixture solidified to a waxlike product. Thereafter, the waxlike product was stored under argon.

A wetting agent, such as a solution of modified polydimethylsiloxane (BYK®-306 procured from BYK), the waxlike product, and a catalyst for curing were added to an organic solvent. Preferably, the organic solvent chosen was such that it has a boiling point in the range of 30-200° C., in particular in the range of 60-150° C. at atmospheric pressure. Further, any protic acid or Lewis-acid and any compound releasing such an acid/Lewis-acid at elevated temperature can be used in principle as a catalyst for curing. Preferably, 30.5 µL of wetting agent, 1.666 g of the waxlike product, and 35 mg of catalyst were added to in the order mentioned to 3 mL of the organic solvent, therefore resulting in a precursor solution. Between the consecutive additions of each component, the mixture was stirred for 10-15 min to result in a clear precursor solution. Examples of catalysts that can be used for the step of curing include but are not limited to hydrochloric acid, sulfuric acid, nitric acid, aluminum acetylacetonate, acetic acid, formic acid, propanoic acid or butyric acid.

A substrate with a sensing layer was provided. The sensing layer comprised an oxygen sensitive indicator that was immobilized in a polymer matrix. The indicator suited for the measurement of oxygen was chosen from any of the following: metal-organic complexes comprising a polycyclic aromatic hydrocarbon, such as pyrene and/or its derivatives, oxygen sensitive transitional metal polypyridil complex, in particular $[Ru(bpy)_3]^{2+}$, or a metalloporphyrin complex comprising in particular platinum or palladium.

The resulting precursor solution was coated on the substrate by any of the following coating methods: knife coating, spray coating, dip coating, micro-dispensing or other known forms of printing. Preferably, spin coating was the method chosen to apply the precursor solution to the substrate.

The substrate coated with the precursor solution was then introduced in an oven that was pre-heated to 150° C. The substrate was allowed to age in the oven for 5 hours at the end of which the optochemical sensor element with a scratch-resistant, glassy appearing barrier layer was obtained. Further, protection layers were applied on the barrier layer to yield the entire optochemical sensor element. A reflection layer serving as a light reflection layer was applied on barrier layer. An optical insulation layer serving as an optical insulation layer was applied on the reflection layer. A protection layer composed of a PTFE membrane or a foil was applied on the optical insulation layer.

In a further embodiment, a temperature sensing layer was applied on the surface of the substrate facing away from the measurement medium.

The resulting optochemical sensor element was incorporated in an optochemical sensor and the sensor was exposed to experimental conditions. The experiments involved exposing an optochemical sensor with and without a barrier layer to a medium comprising different gases that serve as interferents. The error in measurements for the exposure of the sensor to these gases was studied over a total exposure time and corresponding experimental results were noted.

Figure 5:
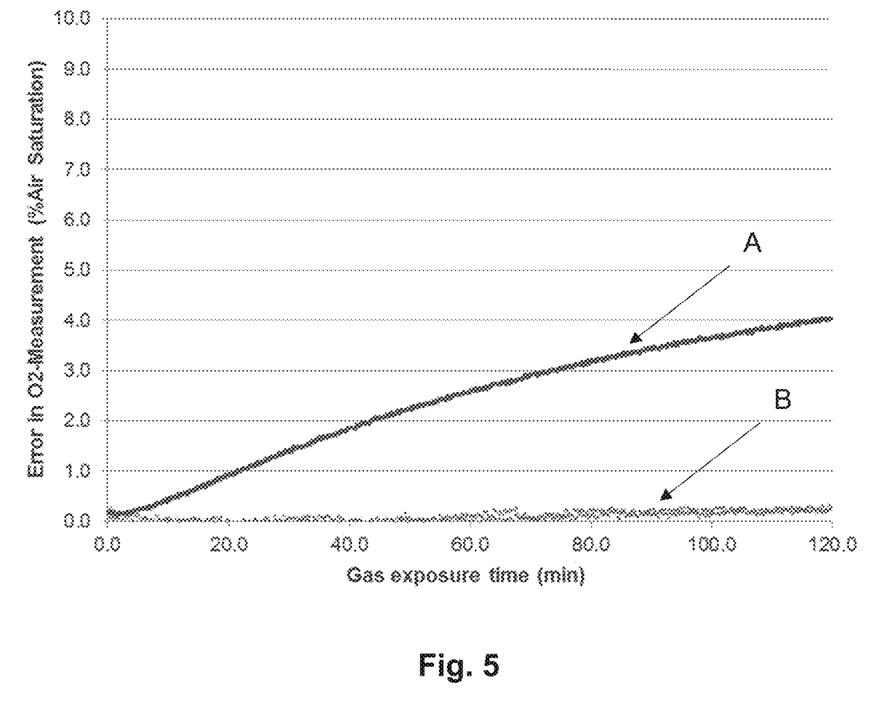
FIG. 5, which is a graph comparing measurements of an optochemical sensor with and without a barrier layer in the presence of an interference gas in a measurement medium.

FIG. 5 is a graph depicting a comparison of the measurements carried out by an optochemical sensor comprising an optochemical sensor element without and with a barrier layer in the presence of an interferent present in a measurement medium. When the optochemical sensor having an optochemical sensor element without a barrier layer was used in a gaseous medium comprising 1% butadiene as the interferent, the measurements showed a steady increase in the error of oxygen gas measurement, as depicted by marking 'A' in the figure. However, when the optochemical sensor having an optochemical sensor element with a barrier layer was used in the same measurement medium, a significant decrease in the error of oxygen gas measurements was observed as compared to the sensor used without a barrier layer. The error in measurement in this case is depicted by marking 'B' in the FIG. 5. The plotted graph shows a steady value of error being almost zero percent error over a period of time when optochemical sensor element having a barrier layer was used.

It is to be understood that the present invention is not limited to the methods described above, but encompasses any and all methods within the scope of the following claims.

What is claimed is:

1. A sensor for measuring at least one of oxygen, carbon dioxide and ozone as an analyte, in a gaseous or dissolved form, in a measurement medium containing at least one interferent, comprising:
   a sensor housing; and
   an optochemical sensor element, arranged within the sensor housing to be in contact with the measurement medium during measurement operation, the optochemical sensor element comprising:
      a substrate,
      a sensing layer arranged on the substrate, the sensing layer comprising a luminescent indicator sensitive to the analyte; and
      a barrier layer, formed by applying a curable precursor on the sensing layer to prevent passage of the at least one interferent in the measurement medium, while allowing the passage of the analyte, the curable precursor comprising an organic part and at least one functional group suitable for curing;
   wherein the at least one interferent is selected from the group consisting of: volatile organic compounds, unsaturated organic compounds, aromatic compounds, sulfurous oxides, nitric oxides and gaseous or volatile compounds containing sulfur, nitrogen, chlorine and combinations thereof.

2. The sensor of claim 1, wherein the at least one functional group is selected from the group consisting of: trialkoxysilane, dialkoxysilane, and monoalkoxysilane.

3. The sensor of claim 1, further comprising:
   at least one light source; and
   at least one detection unit, arranged such that a light path from the at least one light source passes through the optochemical sensor element before striking the at least one detection unit.

4. The sensor of claim 1, wherein the sensing layer comprises an indicator immobilized in a polymer matrix.

5. The sensor of claim 1, wherein the selected gaseous or dissolved analyte is selected from the group consisting of: oxygen, carbon dioxide and ozone.

6. The sensor of claim 5, wherein the indicator is at least one oxygen sensitive indicator selected from the group consisting of: a polycyclic aromatic hydrocarbon, an oxygen sensitive transitional metal polypyridil complex, a metalloporphyrin complex and combinations or derivatives thereof.

7. The sensor of claim 6, wherein the oxygen-sensitive indicator is at least one of: pyrene, a derivative of pyrene, $[Ru(bpy)_3]^{2+}$, a metalloporphyrin complex comprising platinum and a metalloporphyrin complex comprising palladium.

8. The sensor of claim 5, wherein the indicator is at least one carbon dioxide sensitive indicator selected from the group consisting of: 8-hydroxypyrene-1,3,6-trisulfonic acid, a derivative of 1,4-diketo pyrrolo-[3,4-c]-pyrrole and combinations thereof.

9. The sensor of claim 8, wherein the carbon-dioxide sensitive is at least one of: 8-hydroxypyrene-1,3,6-trisulfonic acid or a 1,4-diketo pyrrolo-[3,4-c]-pyrrole derivative.

10. The sensor of claim 5, wherein the indicator is an ozone sensitive xanthene dye.

11. The sensor of claim 1, wherein the optochemical sensor element further comprises a temperature sensing layer having at least one temperature-sensitive indicator arranged to measure the temperature of the measurement medium.

12. The sensor of claim 11, wherein each of the at least one temperature sensitive indicators is selected from the group consisting of: rhodamine, rhodamine derivatives, temperature sensitive metal ligand complexes, lanthanide-doped bulk materials, and YAB doped with chromium ions.

13. The sensor of claim 12, wherein the at least one temperature sensitive indicator is $[Ru(bpy)_3]^{2+}$ or lanthanide-doped $Al_2O_3$.

14. The sensor of claim 1, further comprising at least one additional layer selected from the group consisting of: a reflection layer, an optical insulation layer, a protection layer, and combinations thereof.

* * * * *

UNITED STATES PATENT AND TRADEMARK OFFICE
CERTIFICATE OF CORRECTION

PATENT NO. : 10,876,968 B2  
APPLICATION NO. : 15/973866  
DATED : December 29, 2020  
INVENTOR(S) : Aigner et al.

Page 1 of 1

It is certified that error appears in the above-identified patent and that said Letters Patent is hereby corrected as shown below:

On the Title Page

Item (30), Foreign Application Priority Data, please delete "May 12, 2017
(EP) ................. EP17170846" and insert -- "May 12, 2017 (EP) ................. 17170846.4" --

Item (56), References Cited, OTHER PUBLICATIONS, please delete "Dobson, J.V. et al.,
The Permeability of Gases Through PTE and Other Membranes at 25.degree. C., Electrochimica Acta,
vol. 31, No. 2, pp. 231-233, 1986." and insert -- DOBSON, J.V. et al., The Permeability of Gases
Through PTFE and Other Membranes at 25°C, Electrochimica Acta, Vol., 31, No. 2, pp.
231-233, 1986. --

Item (56), References Cited, OTHER PUBLICATIONS, please delete "Cajlakovic, M. et al.,
Development of an Opto-chemical Carbon Dioxide Sensor for Aquaculture and Oeanography
Applications, Fifth International Conference on Sensing Technology, 2011, pp. 411-416." and insert
-- CAJLAKOVIC, M. ET AL., Development of an Opto-chemical Carbon Dioxide Sensor for
Aquaculture and Oceanography Applications, Fifth International Conference on Sensing Technology,
2011, pp. 411-416. --

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*